United States Patent [19]

Wesseltoft

[11] Patent Number: 4,677,279
[45] Date of Patent: Jun. 30, 1987

[54] OVERHEAD HEATER

[75] Inventor: Per Wesseltoft, Svelvik, Norway

[73] Assignee: Energikontroll A.S., Oslo, Norway

[21] Appl. No.: 829,993

[22] Filed: Feb. 18, 1986

[30] Foreign Application Priority Data

Feb. 18, 1985 [NO] Norway ............................... 850633

[51] Int. Cl.$^4$ .......................... H05B 1/00; F25B 29/00
[52] U.S. Cl. .................................... 219/345; 219/212; 219/342; 219/347; 219/348; 165/53; 165/58
[58] Field of Search ............... 219/213, 342, 345, 347, 219/348; 165/53-58

[56] References Cited

U.S. PATENT DOCUMENTS 2,677,749  5/1954  Raider .................................... 219/39
3,062,945  11/1962  Glynn .................................... 219/345

FOREIGN PATENT DOCUMENTS 2624063  8/1977  Fed. Rep. of Germany .
1006657  10/1965  United Kingdom .

Primary Examiner—E. A. Goldberg
Assistant Examiner—Gerald E. Preston
Attorney, Agent, or Firm—Wenderoth, Lind & Ponack

[57] ABSTRACT

An overhead or ceiling heater panel for room heating, mainly with radiant heat, includes a relatively elongate radiant plate (1) in the form of an extruded aluminum profile or the like, a reflector (2) mounted with a spacing behind the radiant plate seen in relation to the heat radiation direction (S), and attached to the radiant plate at two longitudinal edges (1A, 1B) thereof, and a surrounding box-like housing (3) generally composed of sheet members. Problems with respect to deformation and skew in such a radiant plate are eliminated by providing adjacent each end of the radiant plate (1), a locking spring (10) which is mounted with at least a mounting member (11A, 11B) at one edge (1A, 1B) of the radiant plate (1), and which adjacent this edge is formed with a locking part (10A, 10B) adapted to cooperate with a holding member (21A, 21B) in an adjacent end wall (13) of the surrounding housing (3).

5 Claims, 2 Drawing Figures

OVERHEAD HEATER

BACKGROUND OF THE INVENTION

This invention relates to an overhead or ceiling heater panel for room heating mainly with radiant heat. Overhead heaters of the kind concerned comprise one or more relatively elongate radiation plates in the form of an extruded aluminum profile, a reflector mounted with a spacing behind the radiant plate as seen in relation to the heat radiation direction, and attached to the radiant plate at the two longitudinal edges thereof, as well as a surrounding box-like housing mainly composed of sheet members, for each overhead heater. Each fitting, i.e. each box-like housing may be provided with one, two, three or possibly more, radiant plates. These radiant plates may, moreover, in certain designs be adapted for angular adjustment so as to direct the heat radiation towards desired places in the room to be heated.

An electrical overhead heater with an elongate, box-shaped fitting for delivering radiant heat and designed as a ceiling or overhead heating panel is described for example in Norwegian Patent No. 142 851. Moreover, it may be mentioned that ceiling heaters of the type concerned are manufactured and sold under the trademark "ELZTRIP" (registered trademark).

Two important considerations in connection with a product as discussed here, are that it must be economical in production and operation as well as very robust so that these ceiling heaters may be employed in the most different environments, particularly in industry and workshop premises, without problems.

It has now been found that under these circumstances the extruded aluminum profile which constitute the above radiant plate, may be subject to some deformation, in particular skew after some time of operation. The explanation thereof is believed to be that the radiant plate together with the reflector which is mounted thereon, by repeated heating and cooling in use, will have an accumulated mutual displacement or induced force, which contributes to the skew observed. Possibly another or supplementary explanation may be that material strains in the extruded aluminum profile give rise to the deformations. Such deformation or skew may be further accentuated by the fact that the high temperatures occurring under operation, i.e. temperatures for example in the range 300°-350° C., to some degree make the aluminum material softer so that the mechanical strength and rigidity are not as high as at room temperature.

SUMMARY OF THE INVENTION

A primary object of the invention is to find a solution to the above problem, which surprisingly has been found to be possible by means of a relatively simple and inexpensive structure. According to the invention this consists therein that at each end of the radiant plate there is provided a locking spring which is attached with at least a mounting member at one edge of the radiant plate, and which adjacent this edge is formed with a locking part adapted to cooperate with a holding member in an adjacent end wall of the surrounding housing.

Contrary to what would have been believed, such an arrangement with a locking spring has been found to be fully sufficient in order to stabilize the unit consisting of a radiant plate with a reflector mounted thereon, so that deformation or skew does not develop.

The solution stated here is of particular advantage when the radiant plate or plates is/are angularly adjustable as mentioned above. In such designs with angle adjustment the particular locking spring is utilized according to the invention, to be at the same time a means serving to lock the radiant plate in the respective angular positions, for example three different positions. Thereby the locking spring arrangement will have a dual function which is to a high degree practical and cost reducing.

BRIEF DESCRIPTION OF THE DRAWINGS

In the following description the invention shall be explained more closely with reference to the drawings, in which.

DETAILED DESCRIPTION OF THE INVENTION

Figure 1:
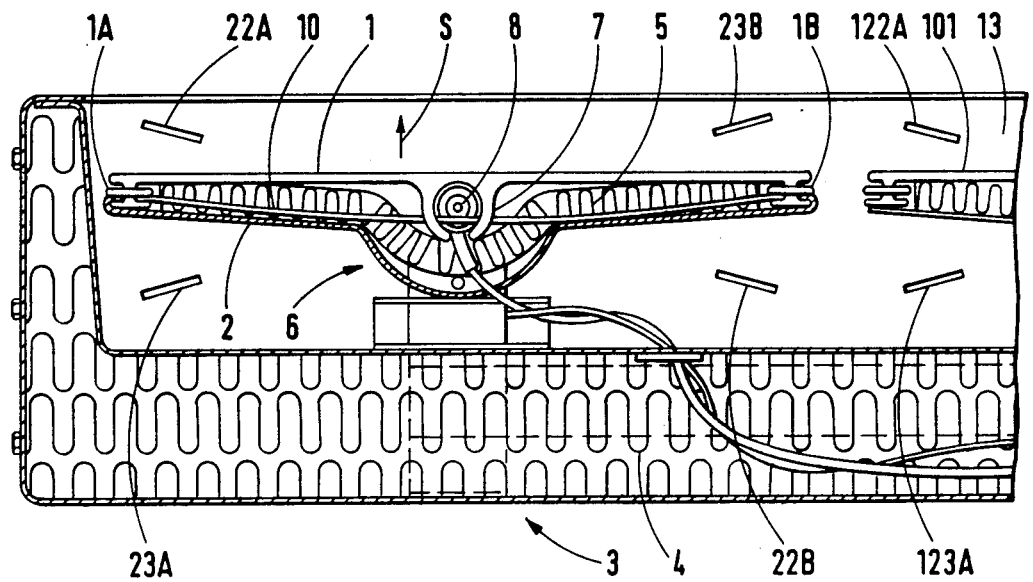
FIG. 1 shows in cross-section a portion of a ceiling heater in an embodiment according to the invention.

The arrangement of FIG. 1 mainly comprises a surrounding housing 3 having broadly a box-like shape with heat insulating material 4 included and being open in one direction, i.e. upwards in FIG. 1. When mounted in a ceiling the orientation of the panel will be the opposite of what is shown in FIG. 1. In the housing 3 there is a cavity accommodating two or more radial plates 1 and 101 (only partly shown). The heat radiation is emitted in the direction of the arrow S from the radiant plate 1. At the rear thereof there is applied an insulation layer 5 and behind this again a reflector 2. Thus, the heat effect will to a substantial degree be delivered as radiation in the direction of the above arrow S, i.e. downwards when the panel is mounted in the normal manner to a ceiling.

A bracket assembly generally designated 6 serves to mount the radiant plate 1 with insulation 5 and reflector 2 in housing 3. Centrally on the radiant plate 1 and at the rear thereof there are provided panel members 7 which inwardly delimit a downwardly open, generally cylindrical cavity for accommodating insulation beads 8 which support an electrical resistance wire lying axially in the cavity or channel. This channel profile 7 is utilized for the attachment in the bracket 6 so that the whole radiant plate with reflector is angularly adjustable about an axis coincident with the centrally located resistance wire in the channel.

The radiant plate 1 is suitably an extruded aluminum profile in which the channel portion or profile 7 is incorporated as an integral part, and in which there is also provided along both edges 1A and 1B grooves opening outwards and inwards respectively, in relation to the central portion of the radiant plate. As shown in FIG. 1 the reflector 2 is attached to both edges 1A and 1B of the radiant plate 1 by folding the outer edge of the reflector 2 into the outward grooves along the edges of the radiant plate. This is per se a simple and effective joining method which results in a robust and practical structure of the unit consisting of radiant plate 1, insulation layer 5 and reflector 2.

As mentioned above it has been found, however, that this structure under certain circumstances may lead to deformation or skew in the radiant plates 1 during operation. In this connection it is remarked that the radiation emitting surface of the radiator 1 has been shown as a substantially plane surface, which is considered to be an advantage. This, however, is not strictly necessary. Nevertheless various problems result when the above skew develops. This may, inter alia, have influence on the intended radiation direction as well as on the lifetime and appearance of the structure.

Figure 2:
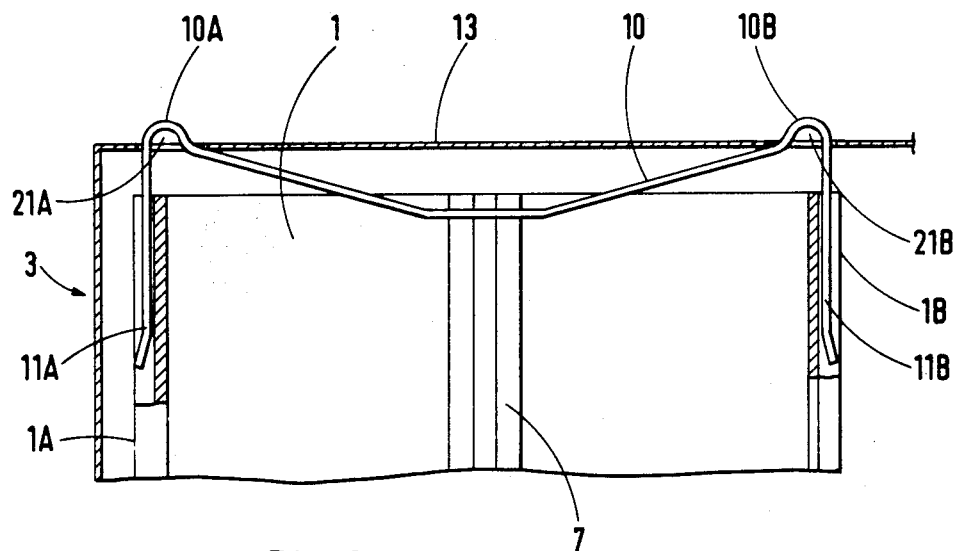
FIG. 2 shows much simplified the main components in the arrangement according to the invention in the embodiment illustrated in FIG. 1, seen from the rear of the radiant plate and partly in section.

The particular solution which serves to eliminate the risk of deformation or skew, has as a main component a spring 10 made for example of heat resistant galvanized spring thread. At its middle portion the thread shaped locking spring 10 is anchored in an incision in the channel parts 7 and extends to the edges 1A and 1B at which mounting parts 11A and 11B (see FIG. 2) are inserted into the grooves at each edge of the radiant plate 1 as mentioned above. Thus, the mounting parts 11A and 11B constitute mounting members and provide for a powerful mechanical connection between the locking spring 10 and the edges of the radiant plate 1. As further appearing from FIG. 2 there are formed adjacent said edges and mounting members 11A, 11B bends 10A and 10B respectively, on the locking spring 10 for cooperation with slit shaped holes 21A and 21B respectively, in an end wall 13 of housing 3. In FIG. 1 these holes 21A and 21B are hidden by the radiator structure, whereas therein two further pairs of holes are shown, namely 22A-22B and 23A-23B respectively, being intended for two additional angular positions of the radiant plate 1 deviating towards each side from the purely horizontal position shown in FIG. 1.

By means of for example a screw driver inserted between the end wall 13 and the locking spring 10, the latter may easily be pressed out of the holes 21A and 21B (see FIG. 2) in order that the radiant plate 1 may be rotated to one of the two deviating angular positions defined by the pairs of holes 22A—22B and 23A-23B respectively, as shown in FIG. 1. This angular adjustment constitutes a favourable feature in addition to the main purpose of the locking spring 10, i.e. to stabilize the radiant plate 1 with associated insulation and reflector 2, so that the skew mentioned does not develop. In this connection it is evident that a corresponding anchoring with a locking spring must also be provided at the opposite end of the radiant plate, where there will be an end wall or sheet in the housing 3 corresponding to the end wall 13 shown.

An additional utilization of the locking spring 10 appears from the drawing, in particular from FIG. 1. In the central channel with resistance wire and insulation beads 8, these insulation beads, which are lying in a row in the channel or cavity, are held in place at the ends of the channel by means of the locking springs, which are mounted in incisions in the channel parts 7 as explained above.

Even though the above description, particularly in connection with FIG. 1, is based upon an embodiment with angle adjustability, it is obvious that the fundamental solution with a locking spring also has its full effect against deformation and skew in embodiments with a fixed angular position.

Moreover, it is clear that the invention is of interest in ceiling heaters having one, two or more radiant plates, i.e. a number different from the two radiant plates shown in FIG. 1. The (partially) shown radiant plate 101 therein is also angularly adjustable, with holes as indicated at 122A and 123A respectively.

The locking spring 10 with its mounting members or parts 11A and 11B respectively, may cooperate either with the inward or the outward grooves at the edges 1A and 1B of radiant plate 1. The mounting of the locking spring 10 at each end of the radiant plate 1 may be provided for substantially by means of the spring force given by the thread shape. It is practical, however, that the middle portion of the shaped locking spring 10 is retained in the above incisions in the channel parts thereby that the outer end portions thereof are pressed or struck against the thread portion when the locking spring 10 has been located in the incision.

The choice of material, in particular of the radiant plate 1, but also of the reflector 2, involves various possibilities and not only aluminum. The solution according to the invention has interest also when using other materials which upon heating to the temperatures concerned, will have their mechanical strength reduced, which may increase the tendency of deformation or skew development. The insulation layer 5 behind the radiant plate may possibly be completely eliminated, since the air space between the radiant plate 1 and the reflector 2 in most cases is sufficient together with the reflector, for preventing undue heat transport rearwardly.

In addition to the advantages mentioned in the introduction to this description, the arrangement according to the invention besides leads to a favourable centering of the radiant plate in the longitudinal direction between the end walls of the surrounding housing.

I claim:

1. Ceiling heater for room heating mainly with radiant heat, comprising a relatively elongate radiant plate (1) in the form of an extruded aluminum profile or the like, a reflector (2) mounted with a spacing behind the radiant plate seen in relation to the heat radiation direction (S) and attached to the radiant plate at two longitudinal edges (1A, 1B) thereof, and a surrounding box-like housing (3) generally composed of sheet members, characterized in that adjacent each end of the radiant plate (1) there is provided a locking spring (10) which is attached by means of a mounting member (11A, 11B) at the edges (1A, 1B) of the radiant plate (1), and which adjacent each edge is formed with a locking part (10A, 10B) adapted to cooperate with a holding member (21A, 21B) in an adjacent end wall (13) of the surrounding housing (3).

2. Heater according to claim 1, characterized in that the holding member has the form of holes (21A, 21B, 22A, 22B, 23A, 23B, 122A, 123B) through a plate (13) which constitutes the end wall of the housing.

3. Heater according to claim 1, characterized in that the end wall (13) is provided with two or more pairs of holding members (21A-21B, 22A-22B, 23A-23B) adapted to retain the radiant plate (1) selectively in one of two or more angular positions.

4. Heater according to claim 3, characterized in that the locking spring (10) is shaped so that said locking part (10A, 10B) may easily be released from a holding member (21A, 21B) by using a simple hand-tool, for example a screw driver.

5. Heater according to claim 1, characterized in that the locking spring (10) also serves as a blocking for mounted insulation beads (8) at the ends of the central channel (7) on the radiant plate (1), for an electrical resistance wire for heating the radiant plate (1).

* * * * *